July 26, 1966 G. MARCHAND ET AL 3,262,562
FILTRATION-DESICCATION METHOD AND APPARATUS
Filed Dec. 4, 1962 3 Sheets-Sheet 1

July 26, 1966    G. MARCHAND ET AL    3,262,562
FILTRATION-DESICCATION METHOD AND APPARATUS
Filed Dec. 4, 1962    3 Sheets-Sheet 2

United States Patent Office 3,262,562
Patented July 26, 1966

3,262,562
FILTRATION-DESICCATION METHOD AND APPARATUS
Georges Marchand, Clamart, and Pierre Sarrat, Grenoble, France, assignors to Commissariat à l'Energie Atomique, Paris, France
Filed Dec. 4, 1962, Ser. No. 257,805
Claims priority, application France, Dec. 8, 1961, 881,457
4 Claims. (Cl. 210—67)

The present invention relates to the filtration or clarification under semi-continuous conditions of hard to filter solutions, notably those containing uranium having a high isotopic plutonium or thorium content; this invention is also concerned with the drying and precalcination of the resulting precipitate. In all cases these operations are carried out without any loss of product.

When di-uranate is precipitated by causing ammonia to act upon various uraniferous solutions, filtering the resulting mother liquors and obtaining the di-uranate precipitate constitute difficult operations due to the rapid clogging of the conventional gauze, fabric or like filter means utilized, such as the Buchner filters wherein the filtering element is disposed horizontally. Moreover, when physical or chemical treatments are applied to uranium salts having a high isotopic content, due account must be taken of the risks that the precipitate will reach the critical mass and support a self-sustaining chain reaction.

Unfortunately, industrial apparatus currently used for this purpose are ill-suited for preventing the precipitate from reaching the critical mass and on the other hand they are cumbersome.

These requirements either reduce the quantity of product treated in a single run, or necessitate a specific construction of the device consistent with continuous or semicontinuous processes.

It is the chief object of the present invention to provide a filtering and drying method characterized notably in that it avoids the drawbacks of hitherto known methods, a remarkable application of this method being the treatment of mother liquors containing fissile products, notably ammonium di-uranate. This invention is also concerned with a device for carrying out the method broadly set forth hereinabove.

The filtering and drying method according to this invention comprises three main steps.

During the first step the liquid containing the product to be separated by filtration and dried is delivered to a flat or shallow decanting chamber having two relatively large parallel vertical faces consisting of a porous wall with very fine orifices and a metal plate. The precipitate accumulates between the porous wall and the plate as the mother liquors flow through the wall, this operation being stopped when the decanting chamber is filled with precipitate. The precipitate is then dried and calcinated by applying a vacuum process thereto, the decanting chamber being tilted to position the porous wall horizontally with the precipitate under-lying this wall. The precipitate is heated by means of heating resistance elements disposed at spaced intervals behind the plate on the surface corresponding to that of the porous wall. Finally, the distintegrated precipitate is collected out of contact with the air in a container.

This invention is also concerned with a device for carrying out the method set forth hereinabove, this device consisting essentially of a shallow stainless-steel heating tray having longitudinal ribs formed in its bottom, the heating resistance elements being disposed between these ribs, another shallow tray, also made of stainless steel and provided with an orifice for draining the mother liquors and finally a porous wall clamped between the two trays, adequate fastening means being provided for assembling these members. The device further comprises an aperture for introducing the products to be filtered and discharging the precipitate into a suitable container under air-tight conditions.

The thickness or depth of the decanting chamber is subordinate to the nature of the filtered product and of the granulometry of the desired product, with due regard for preventing the precipitate from reaching the critical mass if the products to be treated are fissile materials.

According to a preferred embodiment the porous wall consists of a fine-meshed fabric of polytetra-fluoroethylene.

A thermo-couple probe may be used for automatically adjusting the temperature of the precipitate accumulating in the chamber by sedimentation.

In order to afford a clearer understanding of the essential features and advantages of the present invention, a typical embodiment of a device for carrying out the method of the invention will now be described by way of example with reference to the accompanying drawings, it being understood that various modifications and variations may be brought thereto without departing from the spirit and scope of the invention as set forth in the appended claims. In the drawings:

Figure 1:
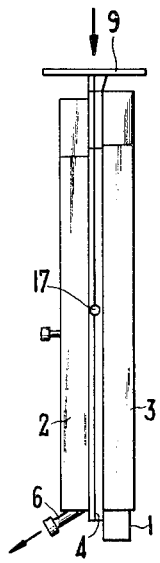
FIGURE 1 is a side elevational view showing the drying filter for carrying out the method of this invention, the filter being in the filling position.
Figure 8:
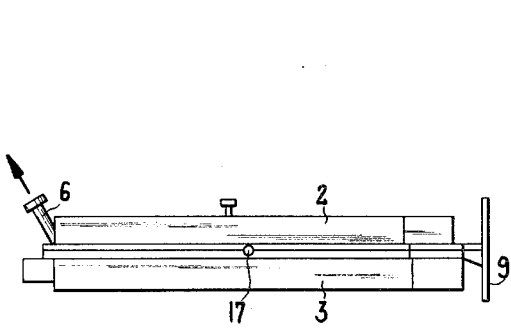
FIGURES 8 and 9 show the drying filter during the drying and draining operations respectively.

The drying filter for carrying out the method of this invention is shown in FIG. 1 and consists of three main elements, i.e. a shallow tray 2 of substantially rectangular configuration, a shallow heating tray 3 having side walls corresponding exactly in shape to those of the first tray 2, this other tray 3 being however somewhat deeper than the first tray 2, and a filtering wall disposed between the assembled edges or flanges of said trays and consisting of a piece of fabric or gauze 4 constituting the third element of the assembly.

The first tray 2 is made of stainless steel and has its bottom reinforced by crossed ribs (not shown). A perforated grid 5 (FIG. 7) is secured on the edges of said first tray to constitute a support for the fabric 4. During the operation of the filter this first tray 2 collects the mother liquors freed of ammonium di-uranate, as will be explained presently, and comprises therefore a draining duct 6. The edge or flange of the tray is discontinued at 7' opposite the duct 6 so as to form with the other tray an opening for receiving the products to be treated and also for draining the drying filter.

Figure 5:
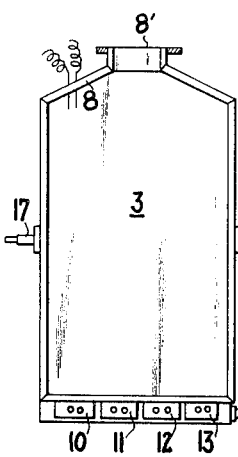
FIGURES 5 and 6 are an elevational view and a sectional view respectively showing portions of the member constituting together with the porous wall the compartment receiving the precipitate during the filling operation.
Figure 6:
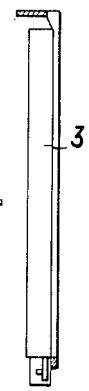
Figure 7:
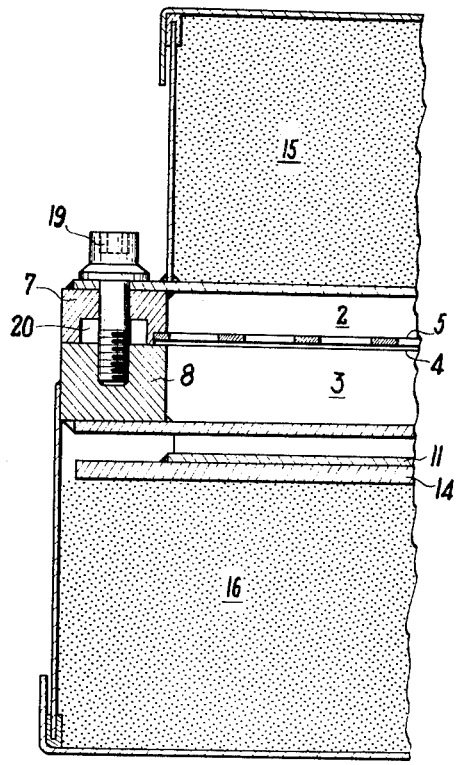
FIGURE 7 is a detail view showing one portion of the drying filter.
Figure 11:
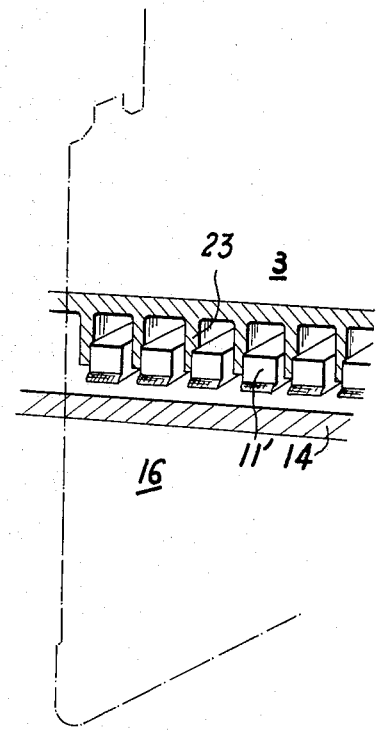

The other tray 3 also made of stainless steel has its bottom ribbed longitudinally at 23 but on its outer face. The edge or flange 8 of this tray 3 is also discontinued as at 8', this break 8' registering with the break 7' in the edge 7 of the first tray. These two breaks form together an opening 9 for introducing the products to be treated and draining the drying filter. Four resistance heating elements of which the pairs of terminals 10, 11, 12 and 13 are visible in FIG. 5 (resistance element 11' is seen in FIGS. 7 and 11) are clamped by a metal plate 14 (FIG. 7) and disposed between the longitudinal ribs of the bottom wall of this tray. The bottoms of the two trays are lined with a thick layer 15 or 16 of heat-insulating material. A pair of trunnions 17, 18 secured on this first tray intermediate the longer sides thereof extend transversely thereto, to permit the tilting of the drying filter. A lever and a pawl-and-ratchet device (not shown) are provided for moving and setting the device in the desired angular positions about the trunnion axis for performing the filling filtration-desiccation and draining operations.

Al already explained the fabric or gauze filter element 4 is disposed between the edges of the registering trays 2 and 3 having identical external dimensions, and clamped in position by means of bolts such as 19 (FIG. 7). It will be seen that the edge of tray 2 has a groove 20 formed therein in order more efficiently to clamp the fabric or gauze filter element 4. This groove may be used if desired as an auxiliary cooling air circulation during the drying operation.

The best drying-filter efficiency is obtained when the fabric or gauze filter consists of polytetrafluoroethylene. The use of this specific material is attended by many advantages. The finest particles are filtered very satisfactorily, the filtration cake separates more easily from the filter gauze during the drying operation due to the low adherence of the precipitate and to the contraction occurring during the drying step, and moreover, this material is characterized by a very good resistance to the chemical agents utilized, notably to nitric acid used for decontamination purposes. The fabric will withstand without any appreciable alteration a relatively long heating time at 150° C. during the drying step. Finally polytetra-fluoroethylene is not wettable, its water retaining power being extremely low.

Now a typical example of the manner in which the filtration-drying method of this invention may be carried out for extracting the uranium contents from an uranyl nitrate solution will be described.

An uranyl nitrate solution having a 60-gram-per-liter uranium content is precipitated by using an ammonia solution. The resulting ammonium di-uranate precipitates and its mother liquors (with a total output of about 15 to 20 liters per hour according to the ammonia concentration used) is fed to the filter disposed in the vertical position (FIG. 1), the mother liquors flowing easily and being subsequently discharged either by means of a liquid-ring vacuum pump or by means of a conventional pump, or if desired by simple gravity.

Advantage is taken of the rate of sedimentation of the ammonium di-uranate in these mother liquors. The mother liquors enter on one side of the parallelopipedic frame formed by the tray 3 and the vertical filter fabric 4. The rate of decantation of ammonium di-uranate ranges from about 10 m./hr. to about 3 m./hr., according to precipitation conditions. This rate of sedimentation is utilized for preventing the filter medium from becoming clogged. The pressure and density values increase from top to bottom in the filter, the mother liquors having a nearly constant rate of flow through the fabric.

The frame fills up gradually from bottom to top, the cake thickness remaining unchanged. The uranium capacity varies as a function of precipitation conditions which exert their influence in turn on density, and also on the packing and retention of the resulting product; this capacity may be considered as varying from 2 to 4 kg. of uranium.

An electrode-type level indicator supplied with 12-v. current is provided for energizing on the one hand a sound and light signal when the desired level is attained, and on the other hand a three-way electromagnetic valve for delivering the solution to be filtered to another waiting filter. The cake is air-dried within a few minutes with the assistance of a large-output vacuum pump.

The filter is then tilted to its drying position while maintaining the vacuum, and the electrical heating resistances are energized. The side containing the precipitate is heated uniformly by means of the flat resistance elements lining the filter surface, the temperature rising uniformly throughout the mass. The thermocouple probes introduced at 22 serving the purpose of stabilizing the fabric temperature at 150° C. are switched on, and the surface of the precipitate is subsequently heated to a temperature ranging from about 200° C. to about 250° C. This operation is carried out while scavenging air by means of vacuum pumps connected to duct 6, thus protecting the fabric 4 against over-heating. The grid temperature is kept at a constant value during about one hour.

Figure 10:
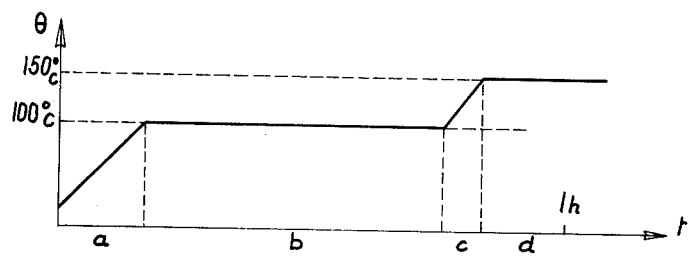
FIGURE 10 is a diagram plotting the temperature variations of the porous filtering wall against time during the different steps of the filtering operation and FIGURE 11 is an enlarged detail of a portion of FIGURE 5.

The diagram of FIG. 10 illustrates how the fabric temperature $\theta$ varies as a function of time during a filtering and drying operation. This diagram shows that the curve $\theta = f(t)$ is divided into four separate sections. The temperature of the precipitate rises firstly gradually (region $a$), then the fabric temperature becomes stabilized as the precipitate is dried at about 100° C. (region $b$), the temperature $\theta$ rising again gradually (region $c$) and finally the regulation level (region $d$) is attained.

The volume of precipitate decreases during the drying operation due to the removal of the included water, so that it separates from the fabric without any difficulty and falls upon the heated surface where it becomes cracked and undergoes a precalcination. The resulting product has a uranium content of the order of 75%. Finally, the heating is discontinued and the mass allowed to cool in vacuo during about one hour.

Figure 9:
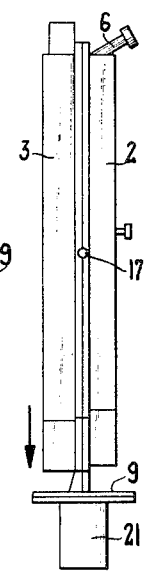
Figure 2:
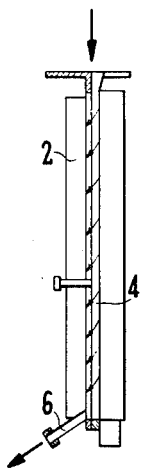
FIGURE 2 is a vertical axial section taken in a plane at right angles to the porous wall.
Figure 3:
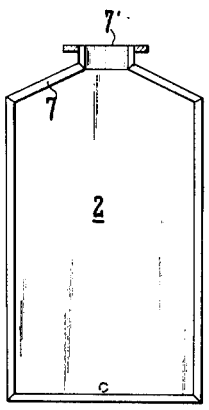
FIGURES 3 and 4 are an elevational view and a sectional view respectively, showing the filter section constituting the porous wall in the drying filter compartment receiving the mother liquors during the filling operation.
Figure 4:

When the product has cooled to room temperature the filter is tilted to the vertical position shown in FIG. 9, that is, with the aperture 9 at the bottom, and the precalcinated precipitate is discharged into a container 21 closed before hand in an air-tight manner and having a suitable geometrical configuration and a suitable volume. The aperture of this container fits properly on the aperture 9 to avoid any loss of product and the latter is thus kept in a geometrical shape consistent with criticality requirements.

Although the present invention has been described in conjunction with a preferred embodiment, it is to be understood that modifications and alterations may be resorted to without departing from the spirit and scope of the invention, as those skilled in the art will readily understand. Such modifications and variations are considered to be within the purview and scope of the invention and appended claims.

What we claim is:

1. In a process of filtering and drying solids in a liquid solids mixture in a flat filtration container having a vertical filtration wall, the steps of feeding the mixture into the container on one side of said filtration wall, separating the liquid by filtration through said filtration wall, withdrawing the liquid from the other side of said filtration wall, collecting the solids along said filtration wall until a predetermined amount of the solids is obtained, rotating the container so that said filtration wall is disposed in a horizontal position with the solids beneath said filtration wall, drying and calcining the solids and then recovering the dried and calcined solids separated from said filtration wall.

2. A rotatable filtration-desiccation apparatus comprising a first flat rectangular receptacle, a second flat rectangular receptacle substantially coextensive with said first receptacle, a filtration wall sealably mounted between said receptacles, said first receptacle having a wall containing grooves, electrical heating means disposed in said grooves, means for feeding a liquid-solids mixture into said first receptacle, means for withdrawing liquid from said second receptacle whereby solids accumulate in said first receptacle along said filtration wall and means for rotatably mounting said receptacles whereby said receptacles and said filtration wall are disposed vertically in a first filtration position and are disposed horizontally in a second heating and drying position.

3. Apparatus as described in claim 2, said filtration wall being a polytetrafluoroethylene cloth of fine mesh.

4. Apparatus as described in claim 2 including a thermocouple probe adjacent said filtration wall measuring the temperature of the precipitate.

References Cited by the Examiner

UNITED STATES PATENTS

| | | | |
|---|---|---|---|
| 1,164,065 | 12/1915 | Burger | 210—68 |
| 1,495,825 | 5/1924 | Von Gunten | 210—415 X |
| 1,577,088 | 3/1926 | Williston | 210—445 |
| 2,736,434 | 2/1956 | Yacoe | 210—184 X |
| 2,824,646 | 2/1958 | Willenborg | 210—68 |
| 3,031,082 | 4/1962 | Smith | 210—232 |

REUBEN FRIEDMAN, *Primary Examiner.*

HARRY B. THORNTON, *Examiner.*

S. ZAHARNA, *Assistant Examiner.*